United States Patent [19]

Bradley et al.

[11] Patent Number: 4,655,912
[45] Date of Patent: Apr. 7, 1987

[54] FLUID VALVE ASSEMBLY

[75] Inventors: Jerome R. Bradley, Sterling Heights; Gregory F. Long, Canton, both of Mich.

[73] Assignee: Ex-Cell-O Corporation, Troy, Mich.

[21] Appl. No.: 771,867

[22] Filed: Sep. 3, 1985

[51] Int. Cl.[4] .............................................. F02C 7/22
[52] U.S. Cl. .................................. 210/133; 210/409; 210/432
[58] Field of Search .............. 210/409, 407, 130, 133, 210/429–432; 239/5, 104, 132.5, 402, 416.2; 60/742, 748

[56] References Cited

U.S. PATENT DOCUMENTS 3,120,490  2/1964  Samson ............................... 210/409
3,247,967  4/1966  Kucmeosky ........................ 210/409

Primary Examiner—Frank Sever
Attorney, Agent, or Firm—Edward J. Timmer

[57] ABSTRACT

The fluid valve assembly includes a hollow movable valve having an open-ended tubular fluid filter in the longitudinal bore of the valve and overlying transverse fluid discharge passages in the hollow valve to filter fluid before it flows through the transverse discharge passages from inside the valve. Downstream of the tubular fluid filter, the hollow valve includes one or more fluid metering passages which are moved relative to a valve seat to control a second flow of fluid from inside the valve. The increased fluid flow longitudinally in the valve bore when the valve is moved from the seat to effect the second fluid flow exerts a washing action on the tubular fuel filter to remove debris or foreign matter therefrom and carry same out through relatively large fluid passages not prone to clogging.

8 Claims, 4 Drawing Figures

FLUID VALVE ASSEMBLY

FIELD OF THE INVENTION

The present invention relates to fluid valve assemblies, especially fuel metering valve assemblies for controlling fuel flow to a fuel nozzle in a gas turbine engine.

BACKGROUND OF THE INVENTION

U.S. Pat. No. 3,433,760 issued to Simmons illustrates a fuel nozzle assembly having a fuel strainer and a secondary fuel metering valve wherein the fuel strainer is stationary on the valve housing and the metering valve is movable in the valve housing. U.S. Pat. Nos. 3,022,954 to Davies; 3,154,095 to Cleminshaw and 2,954,172 to Grundman illustrate filter and metering valve arrangements similar to that of U.S. Pat. No. 3,443,760 in terms of having a stationary fuel strainer or filter and a movable valve in a housing.

U.S. Pat. No. 2,748,949 to W. S. James describes an oil filter assembly while fluid filters of various construction are disclosed in U.S. Pat. Nos. 3,113,925; 3,224,583 and 3,224,584 issued to N. O. Rosaen.

U.S. Pat. No. 4,491,272 issued to Jerome R. Bradley et al of common assignee shows a fuel valve assembly in which a stationary tubular fuel filter in a valve housing is washed by fuel flow discharging from an upstream check valve when both primary and secondary fuel are flowing.

SUMMARY OF THE INVENTION

The present invention contemplates a fluid valve assembly having a fluid inlet, a hollow fluid control valve movable in a valve housing with an internal longitudinal bore of the valve receiving fluid from the fluid inlet and with one or more first generally transverse discharge passages in the valve connecting the longitudinal bore with a first fluid discharge means and with one or more second generally transverse downstream passages connecting the longitudinal bore with a second discharge means when the valve is actuated. A fluid filter is carried on the valve inside the longitudinal bore for filtering the fluid flow prior to its entering the first upstream transverse passages and is movable with the control valve. When actuated, preferably by a fluid pressure increase above a selected level, the control valve is moved relative to a valve seat so as to provide a controlled second fluid flow from the longitudinal bore inside the valve to the second fluid discharge means. In a typical embodiment, the second fluid flow, when provided by actuation of the control valve, is relatively high compared to the first fluid flow and the increased fluid flow in the valve bore exerts a washing action on the fluid filter to remove debris or other foreign matter from the filter and carry same with the second fluid flow through the second fluid discharge means which typically includes flow passages larger in cross-section than those of the first fluid discharge means and thus less prone to clogging.

In a preferred embodiment of the invention, an open-ended tubular fuel filter is of a diameter to be positioned in slight interference fit in the longitudinal bore of the control valve and is held releasably in fixed position on the control valve for example by a snap ring or clip. The tubular fuel filter is positioned such that the filter portion thereof intermediate the ends of the filter overlies the first discharge passages for the first fluid flow.

The present invention also contemplates a fluid valve assembly of the type just described or other types wherein a baffle is placed inside the valve housing in the fluid flow path between the fluid inlet and an inner chamber inside the housing. The baffle deflects fluid to flow to otherwise stagnant fluid areas inside a valve housing and includes multiple apertures connecting the inner chamber to an outer chamber formed by the baffle with the apertures preferably sized so as to function as a fluid strainer in the fuel flow path to prevent foreign particles of larger size from entering the inner chamber. The baffle along with other means in the housing causes multiple reversals in direction of fluid flow along the length of the valve housing to provide a cooling effect should the valve assembly be operated in an elevated temperature environment such as a fuel nozzle assembly adjacent the combustor of a gas turbine engine.

BRIEF DESCRIPTION OF THE DRAWINGS

FIG. 3 is an enlarged longitudinal sectional view of the downstream end of the metering valve of FIG. 1.

FIG. 4 is an end elevation on the downstream valve end showing a flat thereon to allow controlled leakage for cooling.

DESCRIPTION OF PREFERRED EMBODIMENTS

Figure 1:
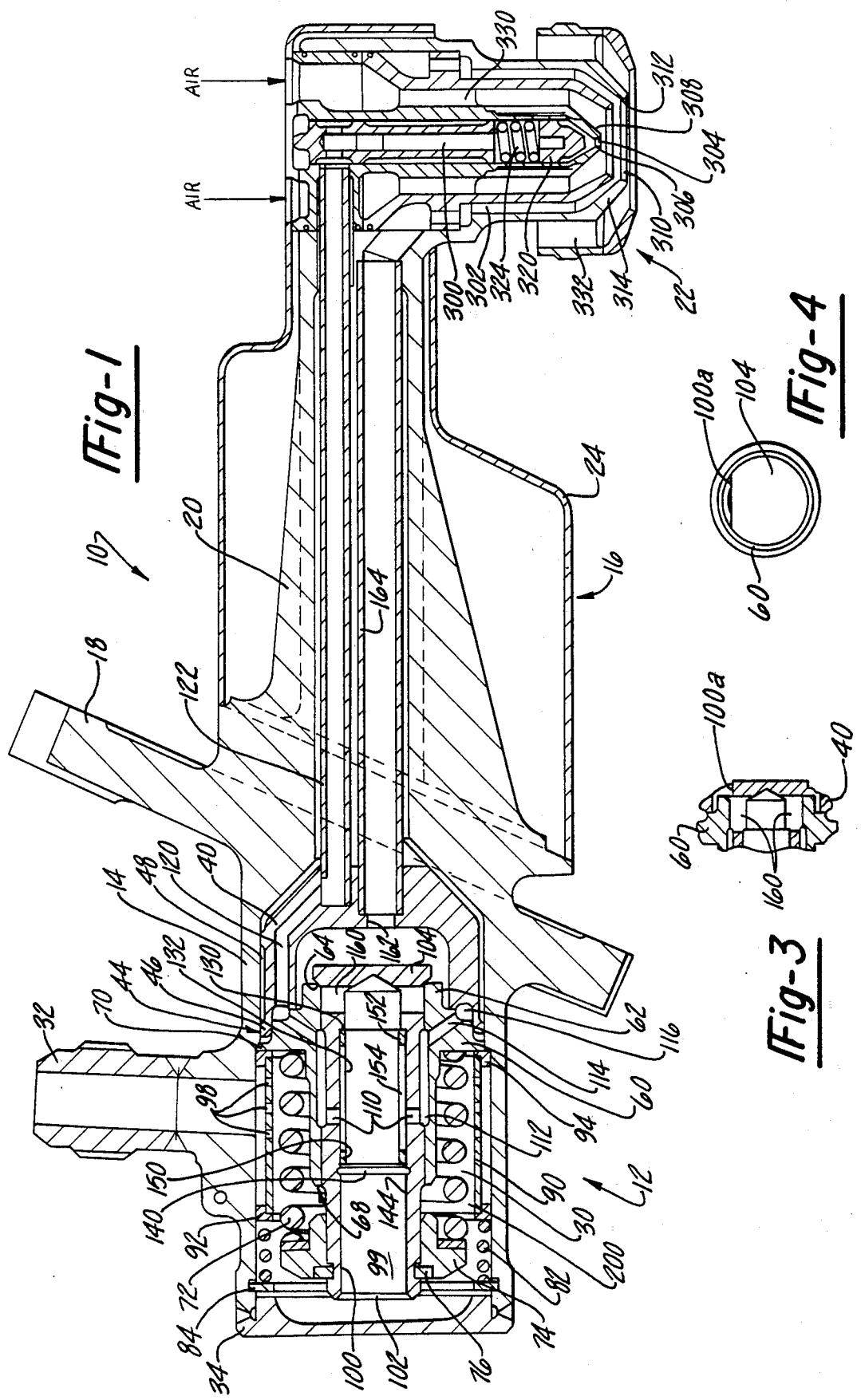
FIG. 1 is a longitudinal sectional view of a fuel valve and nozzle constructed in accordance with the invention.

FIG. 1 illustrates a fuel nozzle assembly 10 constructed to have a fuel valve assembly 12 in accordance with the invention in a housing 14, support assembly 16 with a mounting flange 18 and strut 20, and a nozzle assembly 22. As is well known, mounting flange 18 is secured by bolts or other means to the case or duct (not shown) of a gas turbine engine. The strut 20 includes a heat shield 24 welded or brazed thereto.

Figure 2:
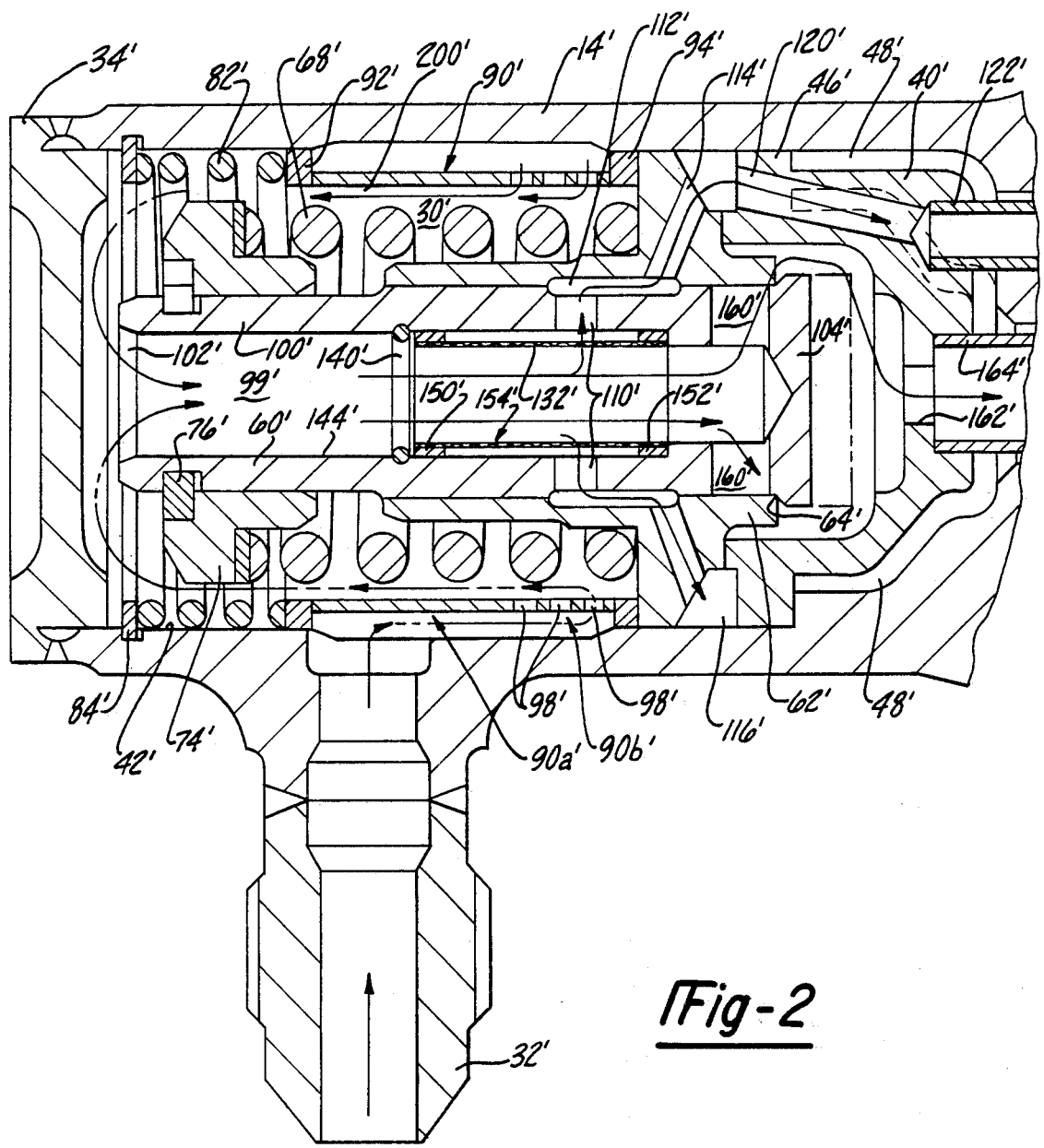
FIG. 2 is an enlarged longitudinal sectional view of a slightly different valve assembly where like reference numerals primed represent like features.

As shown best in FIGS. 1 and 2, the fuel valve assembly 12 is disposed inside an elongate internal chamber 30 in housing 14. Housing 14 includes a fuel inlet fitting 32 for connection to a suitable source of pressurized fuel such as a fuel manifold (not shown) supplied with fuel by a pump (not shown) in well known manner. Typically, a plurality of fuel nozzle assemblies are connected to the fuel manifold to receive fuel therefrom. A cap 34 is welded or brazed onto the open end of the housing 14 to close off internal chamber 30.

The fuel valve assembly 12 includes a valve support cup member 40 brazed to the inner housing wall 42 forming the internal chamber 30 at 44 on a lateral or radial flange 46 on the cup member. As best seen in FIG. 2, an air space 48 is formed between the cup member and housing wall by virtue of the lateral extension of flange 46 away from the cup member with the air gap providing a heat insulating gap.

Seated against the upstream end of the support cup member is a valve seat and guide member 60. The valve seat and guide member includes a cylindrical sleeve 62 having a valve seat 64 at the downstream end and an open upstream 68. A lateral or radial annular flange 70 extends from sleeve 62 to the housing wall 42 as shown. A coil spring 72 is held between the annular flange 70 and retainer ring 74 held fixed in position on the exterior of metering valve 100 by a retainer clip 76 for biasing the metering valve 100 as will be explained. The sleeve 62 is held in place against the upstream end of the support cup member by a larger diameter coil spring 82 which is seated against an annular retainer clip 84 in a groove in housing wall 42 and against an annular cylindrical baffle 90.

Baffle 90 comprises an upstream support ring 92 and downstream support ring 94 with a baffle tube 90 affixed thereto as shown by welding or brazing. The baffle tube 90 includes multiple apertures 90 adjacent the downstream end for purposes to be described. Thus, coil spring 82 biases the baffle 90 and seat and guide member 60 in place against the upstream end of the support cup member.

Disposed slidably in close fit in the inner longitudinal bore 63 of sleeve 62 is a hollow fuel metering valve 100. The fuel metering valve includes an open upstream end 102 and a downstream end configured to form a valve 104 to mate with valve seat 64 of the sleeve 62. Intermediate the upstream and downstream ends of the metering valve 100 are a plurality (two shown) of transverse or radial fuel discharge apertures or passages 110 extending from the longitudinal valve bore 99 to an annular fuel manifold chamber 112 formed between the valve and sleeve as shown. The manifold chamber 112 in turn is in fuel flow relation with oblique fuel passages 114 in the flange 70 of the sleeve 62. Oblique passages 114 communicate with an annular fuel chamber 116 between the flange 70 and flange 46 of the support cup member 40. Fuel chamber 116 delivers fuel to passage 120 in the support cup member for discharge to a fuel discharge tube 122 in strut 20 as will be explained.

The longitudinal inner bore 99 of the hollow metering valve 100 includes an annular shoulder 130 against which the downstream end of a hollow tubular fuel filter 132 abuts as shown in FIGS. 1 and 2. The upstream end of the tubular fuel filter is held against longitudinal movement in bore 99 by a snap ring 140 in a groove in the bore wall 144 of the valve. The diameter of the tubular fuel filter is selected to provide a slight interference fit in the bore 99. The tubular fuel filter is thereby held in position in the bore 99 on the bore wall 144 of the valve.

It is apparent that the fuel filter 132 includes an upstream annular support ring 150, downstream annular support ring 152 and a tubular filter 154, e.g. 105 micron metal mesh, with the tubular filter 154 overlying the transverse apertures 110 so as to filter fuel prior to its flowing thereinto. Foreign debris and matter in the fuel entering the open upstream end 102 and in bore 99 will thus be prevented from entering fuel apertures 110 and the fuel chambers and passages downstream thereof so as not to clog them.

Adjacent the downstream end of the metering valve 100 are a pair of opposed transverse metering slots 160 extending through bore wall 144 so that upon movement of the valve to the right in FIG. 1, fuel will be metered through slots 160 past the valve seat 64 and then through trimming orifice 162 in support cup member 40 for discharge into tube 164 in strut 20 as will be explained. The metering valve 100 is openable against the bias of spring 72 by an increase in fuel pressure beyond a preselected "opening" fuel pressure value. The full open position of the metering valve is shown in phantom in FIG. 2.

In operation of the valve assembly 12, pressurized fuel flow enters the internal chamber 30 of housing 14 through the inlet fitting 32. With respect to FIG. 2, upon entering the chamber, the fuel flow is directed by a solid (non-apertured) baffle portion 90a' of the baffle 90' generally longitudinally toward the downstream apertured portion 90b' having multiple apertures 98'. Typically, the apertures 98' are sized to prevent large debris and foreign matter in the incoming fuel from entering the internal chamber 30'. Apertured portion 90b thus can function as a fuel strainer to preclude entrance of certain sized foreign matter. If fuel inlet fitting 32 is located generally opposite the aperture 98 as in FIG. 1, then fuel flows directly through apertures 98. Upon passing through the apertures 98, the fuel is caused to reverse in direction to flow longitudinally upstream as a result of flange 46 and sleeve 62 forming a flow reversal means adjacent the apertures 98. The fuel thus flows longitudinally upstream in the flow chamber 200 formed between the tubular baffle 90 and sleeve 62. The reversals in fuel flow eliminate potentially stagnant areas in chamber 30 and provide a cooling action to the housing and valve assembly. Fuel flow is then caused to reverse again to flow longitudinally downstream into the longitudinal bore 99 of the metering valve 100 and ultimately out of fuel apertures 110 after passing through tubular fuel filter 132 and also ultimately past metering valve 100 if it is open. Cap 34 serves as means to help deflect fuel flow into the bore 99 of hollow valve 100. It should be noted that fuel apertures 110 are always open for reception of fuel whereas fuel metering valve 100 may be open varying amounts or closed depending upon the fuel pressure level.

When the metering valve 100 is full open, the fuel flow therepast is considerably higher than that flowing through first discharge passages 110. Fuel flow longitudinally through bore 99 in the valve is as a result considerably increased and functions to wash foreign matter or debris previously collected on the tubular fuel filter 132 from the filter and past the valve into discharge tube 164 in the strut 20. Typically, the fuel passages downstream of the metering valve 100 receiving fuel therefrom are considerably larger in cross-section than those passages downstream from apertures 100 and can readily accommodate such foreign matter or debris for expulsion through the nozzle assembly 22 without clogging the downstream passages or otherwise interfering with fuel flow therethrough.

In the context of a typical gas turbine engine wherein the nozzle assembly 22 is designed to provide a primary fuel spray cone which is always flowing and a secondary fuel spray cone which is flowing only as required for particular high engine thrust levels, the apertures 110 and fuel chambers and passages downstream thereof would provide the primary fuel flow and metering valve 100 and fuel chambers and passages downstream thereof would provide the secondary fuel flow.

For example, filtered primary fuel would flow through discharge apertures 110 and ultimately into discharge tube 122 for flow to the inner primary fuel passage 300 of the nozzle assembly 22 whereas secondary fuel would flow past metering valve 100 as controlled thereby and ultimately into discharge tube 164 for flow to the outer secondary fuel passage 302 of the nozzle assembly. In the nozzle assembly, primary fuel is discharged from inner orifice 304 formed by lip 306 on tube 308 and secondary fuel is discharged form outer concentric orifice 310 formed by lip 312 on concentric tube 314. A plug 320 in the tube 308 includes metering slots or passages as is known to control primary fuel flow and is biased in position in tube 308 by coil spring 324.

As shown, the nozzle assembly includes concentric inner and outer annular air receiving passages 330,332 to discharge an air stream between the primary and secondary fuel spray cones and exteriorly of the secondary fuel spray cone so as to atomize the fuel for combustion in the combustor (not shown) of the gas turbine engine. Of course, other known nozzle assembly designs may be used in lieu of nozzle assembly 22 shown in FIG. 1.

As shown best in FIGS. 3 and 4, the valve 100 includes a flat 100a adjacent valve seat 64 for providing a small amount of controlled leakage flow to aid in cooling the valve assembly 12. This leakage flow is controlled by adjustment of the valve clearance and the axial or longitudinal position of the flat 100a relative to one of the metering slots 160.

Although the invention has been described hereinabove with respect to fuel valve assembly, this description is merely for purposes of illustration. The invention is applicable to fluid valve assemblies in general. Further, although certain preferred features and embodiments of the invention have been described hereinabove and illustrated in the Figures, it is to be understood that modifications and changes may be made therein without departing from the spirit and scope of the invention as defined in the appended claims.

We claim:

1. A fluid valve assembly comprising a valve housing means having a fluid inlet means, a hollow valve means movably disposed in said housing means and having a longitudinal bore means therein receiving fluid from said inlet means, said valve means having first fluid passage means in fluid flow relation with said bore means and second fluid passage means in fluid flow relation with said bore means, fluid filter means in said bore means carried on and movable with said valve means and positioned for filtering fluid flowing to said first fluid passage means and exposed for fluid washing action of debris or foreign matter therefrom by increased fluid flow in said bore means when the valve means is actuated, first fluid discharge means on said housing means in fluid flow relation with said first fluid passage means, second fluid discharge means on said housing means in fluid flow relation with said second fluid passage means for receiving and discharging said increased fluid flow and debris or foreign matter from said bore means when said valve means is actuated, and means for actuating the valve means to provide increased fluid flow from said bore means.

2. The fluid valve assembly of claim 1 wherein the filter means includes a washable filter surface exposed in said bore to fluid flow along said bore to wash debris from said surface and carry same through the second fluid passage means when said valve means is actuated.

3. The fluid valve assembly of claim 2 wherein the second fluid passage means and second discharge means are downstream from and relatively larger in cross-section than said first passage means and first discharge means to accommodate said debris.

4. The fluid valve assembly of claim 1 or 2 wherein the filter means comprises an open-ended tubular filter with an intermediate portion thereof overlying the first fluid passage means in said bore to filter fluid prior to its entry into said first fluid passage means.

5. The fluid valve assembly of claim 4 wherein the tubular filter is concentrically disposed in said bore.

6. The fluid valve assembly of claim 5 wherein the valve means includes a cylindrical bore wall defining said bore with an annular shoulder being located on said bore wall and being abutted against a downstream end of the tubular filter.

7. The fluid valve assembly of claim 4 wherein the longitudinal bore is cylindrical and the tubular filter is a cylindrical tube of a diameter slightly less than the diameter of the cylindrical bore.

8. The fluid valve assembly of claim 1 which is a fuel valve for providing a continuous flow of filtered primary fuel through the first passage means and first discharge means and a flow of secondary fuel through the second passage means and second discharge means as controlled by the valve means.

* * * * *